United States Patent [19]

Tschannen

[11] Patent Number: 4,901,809

[45] Date of Patent: Feb. 20, 1990

[54] DEVICE FOR POSITIONING AND ATTACHING AN AUXILIARY SNOW-CHAIN DEVICE FOR MOTOR VEHICLES

[75] Inventor: Hans Tschannen, Gorgier, Switzerland

[73] Assignee: Bekin St. Aubin S.A., St. Aubin, Switzerland

[21] Appl. No.: 325,265

[22] Filed: Mar. 17, 1989

[30] Foreign Application Priority Data

Mar. 25, 1988 [CH] Switzerland .................. 1136/88

[51] Int. Cl.⁴ .................. B60C 27/02; F16J 3/04; B60T 1/04
[52] U.S. Cl. .................. 180/16; 280/757; 52/222
[58] Field of Search .................. 180/16; 188/4 B; 280/757; 152/222

[56] References Cited

U.S. PATENT DOCUMENTS

| | | | |
|---|---|---|---|
| 2,283,948 | 5/1942 | Ridgway | 188/4 B |
| 2,790,514 | 4/1957 | Robinson | 188/4 B |
| 3,658,158 | 4/1972 | Saupp | 188/4 B |
| 4,751,975 | 6/1988 | Rieger et al. | 180/16 |
| 4,800,939 | 1/1989 | Torneback | 180/16 |

FOREIGN PATENT DOCUMENTS 0195973 10/1986 European Pat. Off. .

*Primary Examiner*—Richard A. Bertsch
*Attorney, Agent, or Firm*—Townsend and Townsend

[57] ABSTRACT

The positioning and attachment of the auxiliary snow-chain device, intended to be arranged under a motor vehicle, is carried out with the aid of suspension locations, preferably three in number (101, 102, 103), which are integrally cast with a cage (1) housing means for driving a swivel arm (3) bearing a small wheel. Each suspension location is made up of a lug provided with a center bore (14) which is traversed by a threaded element having a diameter appreciably less than that of the bore. The top and bottom faces of each lug are rounded. The triangular arrangement of the lugs, which co-operate with components for integration with the vehicle, permits fine positioning at the same time as reliable attachment of the snow-chain device.

15 Claims, 6 Drawing Sheets

DEVICE FOR POSITIONING AND ATTACHING AN AUXILIARY SNOW-CHAIN DEVICE FOR MOTOR VEHICLES

This invention relates to a device for positioning and attaching an auxiliary snow-chain device intended to be arranged under a motor vehicle, of the type including a cage accommodating means for driving a swivel arm, one of the ends of which is integral with the driving means and the other end provided with a small wheel comprising lengths of chain, this arm being able to occupy a free position and an engaged position during which the small wheel, resting against the inner sidewall of the wheel of the vehicle, must be situated in a specifically defined plane relative to said vehicle wheel.

The positioning and attachment of chain devices raise several interrelated problems. First is that of the choice of means utilized for ensuring a really reliable attachment considering the significant stresses to which these means are subjected when the chain device is in use. Then, it is desirable for the means to facilitate mounting of the device. Finally, directly associated with these first problems is that of the positioning of the snow-chain device and, correlatively, that of the adjustment of the small wheel, the position of the latter relative to the inner sidewall of the wheel against which it is to rest having to satisfy certain conditions. The successive approach toward the ideal position of the small wheel is, in fact, carried out especially by acting upon the means for positioning and attaching the snow-chain device.

In prior art devices, some of the ways in which the attachment is carried out is by means of tubes and/or bars and/or sleeves and shells and/or clamps and supports, this after delicate operations of positioning all these elements relative to one another.

Thus mounting of the prior art devices is very tedious and expensive, the successive approach to the final position of the cage and the small wheel being made very difficult.

Generally speaking, with certain prior art devices, the final adjustment of the small wheel relative to the vehicle wheel is made by acting upon specific means, such as ball-and-socket joints, arranged in the zone of connection between the swivel arm and the small wheel.

However, neither the prior art means for positioning the snow-chain device, nor the means for attaching it, have proved satisfactory, especially as concerns reliability. In particular, considering the substantial dynamic stresses, the tightening torques must be very great if the device is to stay securely in place. On the other hand, with corrosion a contributory factor, the parts are found to seize with one another after a short time. Hence any subsequent manipulation of the device, e.g., when readjustment of the position of the small wheel proves necessary, quickly becomes a problem.

In connection with the prior art, reference is made to the present assignee's co-pending U.S. patent application Ser. No. 143,557, now U.S. Pat. No. 4,809,797.

It is an object of this invention to provide an improved positioning and attaching device for snow chains which overcomes the aforementioned shortcomings.

To this end, in the snow-chain device according to the present invention, of the type initially mentioned, the cage comprises least two suspension locations, each having a specific conformation, which conformations each co-operate with one or more locking and attachment components and, at the same time, allow not only direct or indirect securing of the snow-chain device under the vehicle and its positioning, but also the adjustment of the small wheel in the specific plane.

The problem of positioning the device and adjusting the small wheel against the inner sidewall of the vehicle tire which is to be kept from skidding, as well as that of its attachment and locking, is thus solved in an elegant and really reliable manner. Moreover, the work of mounting, as well as that of possible subsequent operations, is considerably facilitated. Finally, the expensive specific means for final adjustment of the small wheel prove unnecessary.

These and other advantages will become apparent from the following detailed description of two preferred embodiments of the invention with reference to the accompanying drawings, in which.

Figure 1:
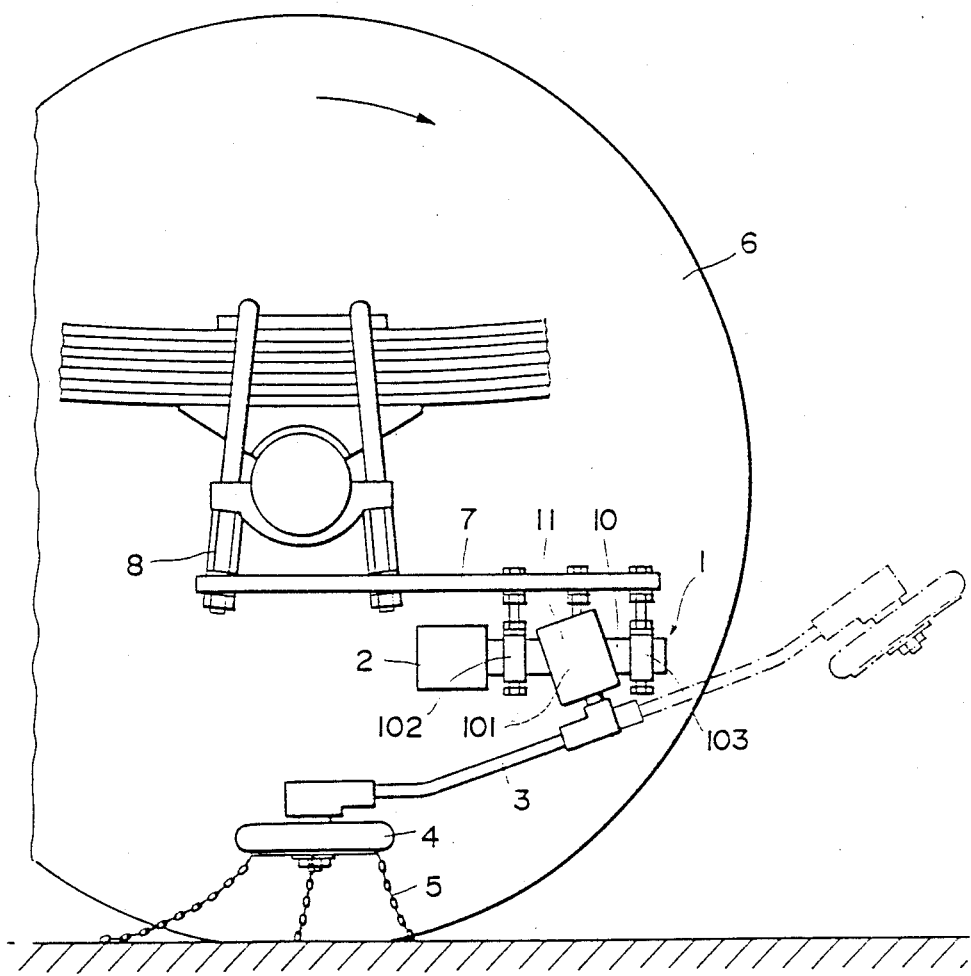
FIG. 1 is an overall diagram of a first embodiment of the invention.

FIG. 1 shows very schematically an example of the mounting of the snow-chain device in the overall arrangement. The cage 1 accommodates the driving components of the arm 3 fixed, at one of its ends, to an arbor emerging from the portion 11 of the cage 1 and provided, at the other end, with a small wheel 4 capable of resting against the inner sidewall of the wheel 6 of the vehicle and provided with lengths of chain 5.

In the embodiment illustrated, the cage comprises three attachment locations 101, 102, and 103 co-operating with attachment components, so that the cage is integral with elements of the vehicle under which the snow-chain device is arranged, such as a frustoconical portion of an axle or, as in the embodiment illustrated, a suspension-spring bracket 8, via an auxiliary element, here a rigid plate 7. In most cases, considering the variety of existing types of vehicles, an intermediate element 7, not necessarily a plate, will have to be provided for, even though the cage 1 as designed does not exclude the possibility of direct attachment.

Figure 2:
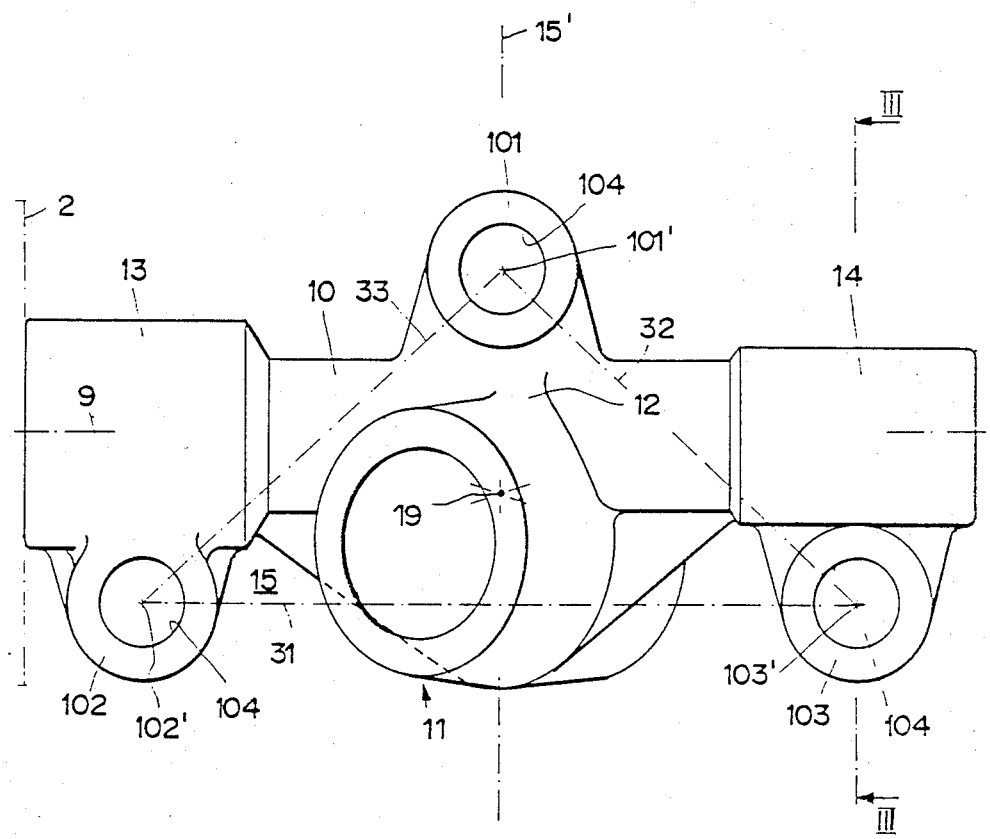
FIG. 2 is a top view of the cage of this embodiment.

FIG. 2 is a top view of a first modification of the cage 1 accommodating the means for driving the small-wheel arm, or swivel arm, 3. The design of the snow-chain device used will preferably be that disclosed in the aforementioned co-pending application. Thus, the cage 1 has a component 10 of a generally elongated shape with a longitudinal axis 9; the middle zone of the component 10 comprises a body 11, disposed obliquely, the axis of the latter, not shown, forming an angle $\alpha$, or $180° - \alpha$, with the longitudinal axis 9. The cage 1 is preferably a casting. A rack may move in the component 10, under the influence of actuating means—made up, for example, of a single- or double-action hydraulic piston—accommodated by a cage 2 situated adjacent to the component 10. The rack meshes with a pinion accommodated in the body 11, from which an arbor emerges to which the smallwheel or swivel arm 3 is fixed. None of these means are shown in the drawing. They are mentioned by way of indication as the attaching device can be adopted for any other auxiliary snow-chain devices.

At three locations—viz., at the two ends 13 and 14 of the component 10, on the one hand, and in the middle zone 12 of that body, i.e., in the zone of the center plane indicated by line 15', which line is perpendicular to the longitudinal axis 9, and opposite to the body 11, on the other hand—the cage 1 comprises suspension locations 101, 102, 103 for attaching the cage 1 under the vehicle. Thus, these locations disposed alternately on both sides of the longitudinal axis 9 constitute a triangular suspension.

Figure 3:
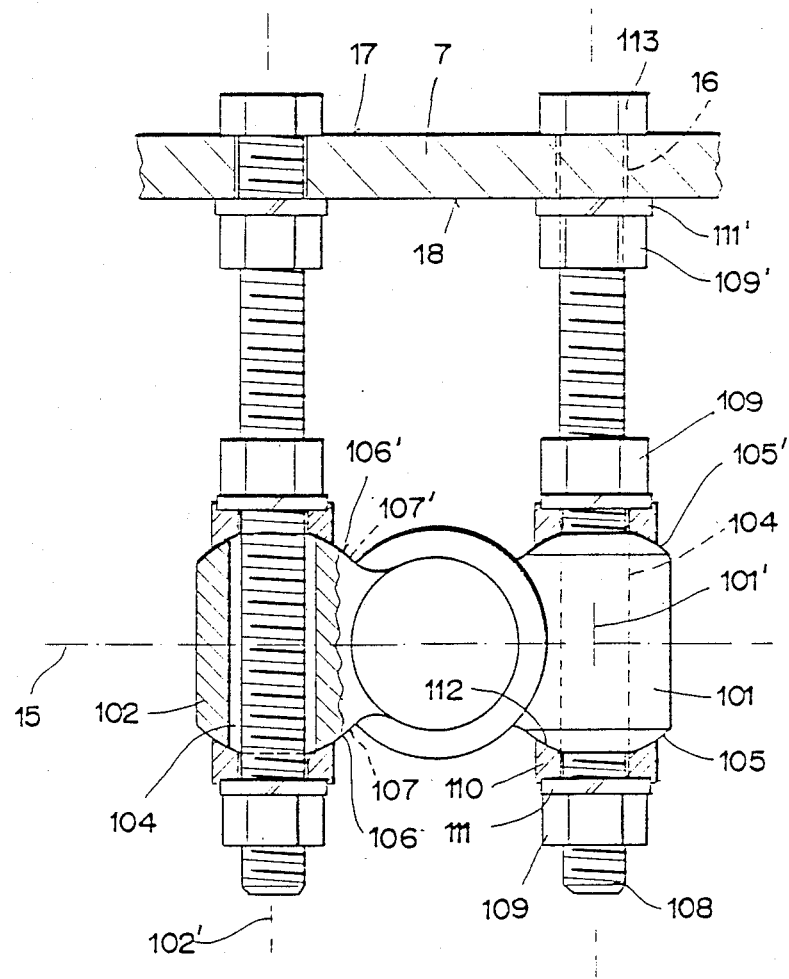
FIG. 3 is a partial section taken on the line III—III of FIG. 2, with the attaching means.

The particular conformations of these suspension locations—hereafter called lugs 101, 102, 103—are also described with reference to FIGS. 3 and 4, which are partial sections taken on the line III—III of FIG. 2, showing the cage 1 in two different positions. The body 11 of the cage 1 is not shown in FIGS. 3 and 4, however. The lugs 101, 102, 103 are connected to the component 10 by ribs (not shown); the assembly 10, 11, 101, 102, 103, 102, 103 may be machine welded, but as already mentioned, a cast part is preferred. Each of the lugs 101, 102, 103 is made up of a truncated cylinder having a respective axis 103', 102', 103' and includes a central bore 104. These axes are all at right angles to the longitudinal axis 9 and are preferably parallel to one another; by the same token, in this embodiment, each lug has a general shape identical to that of the other two. A basic particularity resides in the rounded conformation of the lower and upper faces 105, 105' (lug 101), 106, 106' (lug 102), and 107, 107' (lug 103), the utility of which will readily be understood below. It will be seen that in the modification described, the faces are domed, i.e., convex; the radius of curvature is situated on the inside of the lug and chosen at the point of intersection between the center plane 15 (FIG. 3) and the respective axis 101', 102', 103' of the lug. Concave faces might equally well be used, f course, or even alternately concave/convex. In any case, however, the same radius of curvature will be chosen.

The mode of attachment of the cage 1 will now be explained with reference solely to the lug 101 for the sake of simplicity. The end of a threaded rod or screw 108 passes all the way through the bore 104 of the lug 101. The diameter of the bore 104 is appreciably greater than the diameter of the screw 108. On both sides of the lug, a nut 109, a spring washer 111, and an interposed element 110 permit locking of the lug, and hence of the cage 1, by tightening the nuts 109 on the respective two faces of the lug. It will be obvious that the surface 112 of the interposed element 110, directly adjacent to the faces 105 and 105', respectively, must match that face; in other words, the curvature will be identical.

At the opposite end, the screw 108 passes through a bore 16 in the auxiliary element, in the present case the plate 7. The screw 108 is made integral with the plate 7 by the action of the screw head 113 pressing against the top face 17 of the plate 7 and of the check nut 109'. A spring washer 111', placed between the bottom face 18 of the plate 7 and the nut 109', will ensure better locking. Other analogous attachment means may be utilized. Finally, the plate 7 is integral with one or more components of the vehicle, as has already been stated above.

The cage 1 thus designed will ideally permit the snowchain device to be positioned prior to its final locking (FIG. 4): in a first phase, the device is put in place approximately, i.e., it will be ensured that the small wheel 4, in operating position, hence placed against the inner sidewall of the wheel 6 of the vehicle, is situated in a plane approaching the predetermined ideal plane.

In a second phase, the fine positioning will be undertaken, and thus the final adjustment of the small wheel in the aforementioned plane. For that purpose, the adjusting nuts 109 of the lugs will be acted upon so as to modify the orientation of the center plane relative to a horizontal plane (e.g., the horizontal plane 15") and, correlatively, that of the plane of the small wheel 4. When the ideal position is reached, the cage 1 will be locked by tightening each of the nuts 109 on the respective top and bottom faces of the lugs.

Figure 4:
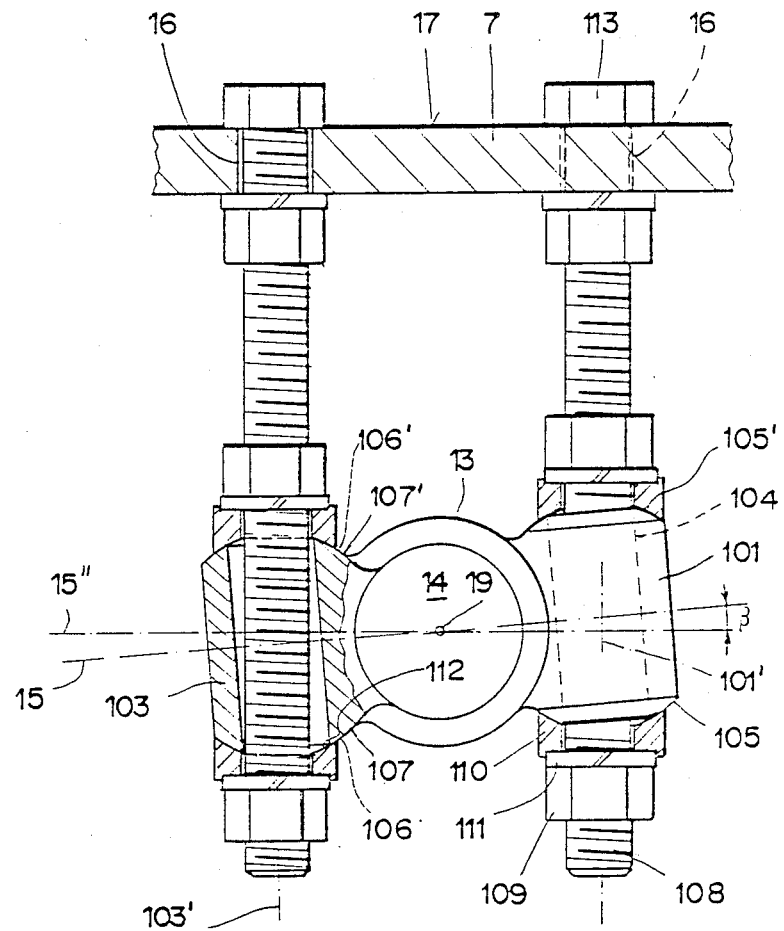
FIG. 4 is a partial section analogous to that of FIG. 3.

It will be observed that owing to the co-operation among the three essential design particularities of the cage 1, viz., firstly, the specific conformation of the lugs 101, 102, 103, secondly, the triangular suspension 101', 102', 103' of the cage 1, and thirdly, the dimensioning of the diameter of the bore 104 relative to the diameter of the screw 108, the cage 1, hence the center plane 15, can be "tilted" by an angle $\beta$ in all radial directions relative to a horizontal plane, e.g., 15" (FIG. 4). In FIG. 2, by way of indication, a triangle with corners 31, 32, 33 is shown in dot-dash lines. This triangle is situated in the center plane 15; its vertices are constituted by the intersections of this plane with the axes 101', 102', and 103'. The "tilting" of the cage 1, i.e., the positioning thereof, may be achieved in several ways. For example, let it be assumed that only lug 101 is to be acted upon, causing it to be raised or lowered, as need be, with the aid of the screw-and-nut assembly 108, 109, and that it is not desired to vary the positions of the lugs 102 and 103. In that case (the nuts 109 of the lugs 102 and 103 being just loosened, of course), the cage 1, hence the center plane 15 determined by the triangle 31, 32, 33, will rotate about the axis 31, with the lugs 102, 103 acting as ball-and-socket joints. Analogously, the plane 15 may tilt about the axes 32 or 33. When, on the other hand, the three lugs are acted upon simultaneously, the center plane 15, i.e., the triangle 31, 32, 33, will be able to pivot in all directions about the horizontal. All these planes, whatever their orientation, will pass through a point 19 which is the center of gravity of the triangle 31, 32, 33 (FIG. 2). Furthermore, as may be seen in the drawing, this point may itself move vertically, parallel to the axes 101', 102', 103'. Depending upon the design of the suspension locations, i.e., the arrangement of the lugs 101, 102, 103, this point 19 may be on the longitudinal axis 9, as shown in FIG. 4. As regards the values of $\beta$ and by way of indication, for a bore 104 which is 21 mm in diameter and a screw 108 which is 16 mm in diameter, and for a lug height of 55 mm, the angle $\beta$ may vary within a range of about 0° to 5°.

The auxiliary snow-chain device provided with a positioning and attachment device such as described may be mounted on all types of vehicles. A shorter swivel arm will naturally be utilized for light vehicles than for heavy vehicles. By the same token, the diameter of the attachment screws, as well as of the matching washers (i.e., parts analogous to those designated above as 108, 109, 110, 111) will be adapted accordingly. Screws of 12 mm diameter may be used, for instance.

The present invention optimally meets all the requirements set forth at the beginning. It combines precision of positioning of the snow-chain device and hence of the adjustment of the small wheel in the ideal plane, reliability of the attachment, ease of mounting, and efficiency of design.

Figure 5:
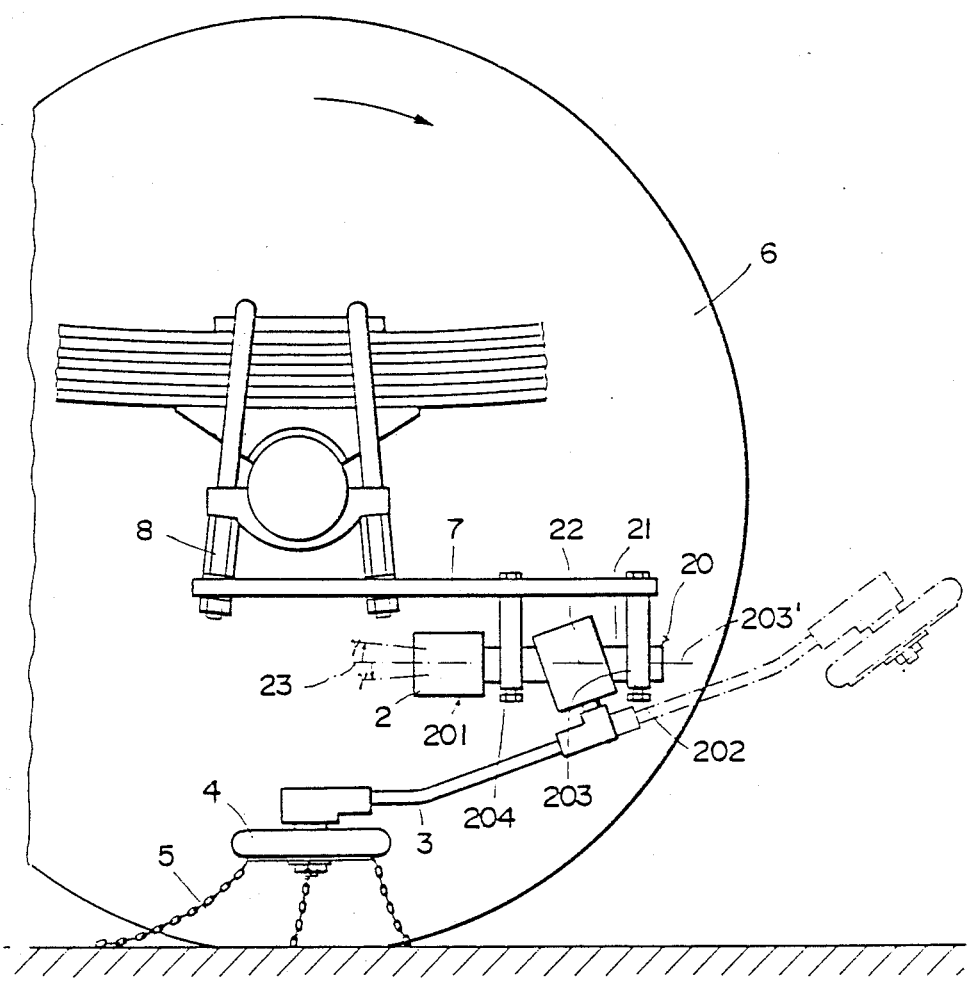
FIG. 5 is an overall diagram of a second embodiment of the invention.
Figure 6:
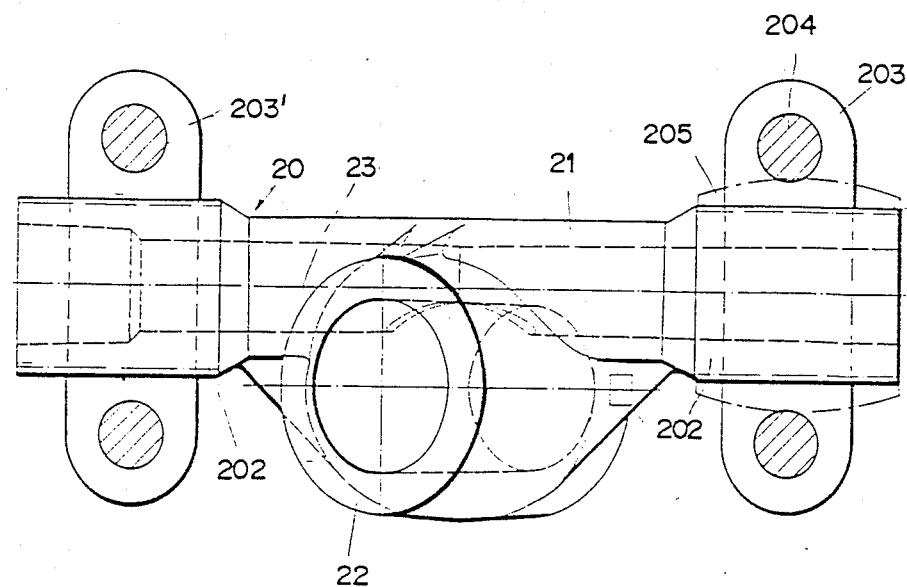
FIG. 6 is a top view of the cage of this embodiment.

A second embodiment is illustrated in FIGS. 5 and 6. The cost price of this embodiment is slightly less than that of the first embodiment described. The possibilities of orientation, represented by the angle γ, are reduced, however.

The elements already encountered in the description of the first embodiment will hereafter be designated by the same reference numerals.

Analogously to FIG. 1, FIG. 5 shows diagrammatically the overall arrangement of the snow-chain device. The latter differs from the first embodiment in that the driving cage 20, which accommodates the means for driving the smallwheel or swivel arm 3 (analogous to the means mentioned earlier), has only two suspension locations instead of three. The cage 20 is made up of a component 21 of generally elongated shape with a longitudinal axis 23, and of a body 22 disposed obliquely relative to the component 21, the respective axes of these two parts forming an angle slightly other than 90°. The cage 20 is preferably a cast part. Furthermore, the cross-section of the component 21 is preferably cylindrical. The attachment locations 201, 202, at the site of which the diameter is slightly reinforced, are disposed at each of the ends of the component 21. Mounted at each location 201, 202 are regulating and attachment means, e.g., brackets shown schematically as 203. These brackets are squeezed at the locations 201 and 202, respectively, in a manner known per se, by means of screws 204 and nuts (the latter not being shown). Analogously to the first embodiment, the cage 20 will in most cases be integral with an auxiliary element, e.g., with an intermediate plate 7, by means of the same screws 204, the plate 7 again being fixed in turn to elements 8 of the vehicle. It will be obvious that any other known locking means might be used in lieu of the brackets 203, 203' and screws/nuts 204. Positioning of the device is achieved, before tightening, by displacement of the cage 20 along the longitudinal axis in one direction or the other, on the one hand, and on the other hand by a slight inclination γ of the axis 23 about the horizontal (FIG. 5), but only in the direction of the length of the cage 20. This possibility of inclination may be improved by providing, at the attachment locations, a rounded shape 205, shown in dot-dash lines at the location 201 in FIG. 6. It will be obvious that the cage 20 may equally well be rotated about its axis 23. In a modification, it is possible to maintain the cylindrical shape of the attachment locations 201, 202 and to arrange sleeves (not shown) at these locations, the bores of these sleeves corresponding to the diameter of the locations 201 and 202, respectively, and the outside shape reproducing the rounded shape similar to that bearing reference number 205.

It will be seen that this second embodiment offers less extensive possibilities of orientation of the driving cage than those of the first embodiment. On the other hand, the size of the cage is slightly reduced, as well as the cost. The preference may be given to one or the other of the embodiments described, as the case may be.

What is claimed is:

1. A snow-chain device intended to be arranged under a motor vehicle, having an engaged and a retracted position, and comprising a plurality of lengths of chain, a chain-wheel having a circular rim defining a geometric plane, said rim being adapted to press against one wheel of said vehicle in said engaged position, a swivel arm, support means, and motor means held by said support means and arranged for rotating said swivel arm about a first axis of rotation having a predetermined direction with respect to said support means, said chain-wheel being freely-pivotally mounted at a free end of said arm to rotate about a second axis of rotation perpendicular to said plane and having a predetermined direction with respect to said arm, and said plurality of lengths of chain being distributed around said chain-wheel, with one end of each chain secured to said wheel, wherein said support means comprises a cage enclosing said motor means, said cage comprising at least two suspension locations at predetermined positions within said cage, the device further comprising a plurality of locking and attachment components, said components being arranged for cooperating with said suspension locations to allow securing of said cage under said vehicle and adjusting the position of said cage such that said second axis of rotation and said plane have predetermined positions with respect to said one vehicle wheel when said swivel arm extends in said engaged position under the influence of said motor means.

2. The device of claim 1, wherein said cage, having a generally elongated shape with a front end and a rearward end, respectively, with a longitudinal axis, comprises three suspension locations alternately disposed on both sides of said longitudinal axis.

3. The device of claim 2, wherein the three locations each have the shape of a lug provided with a bore, the axes of said bores being at right angles to said longitudinal axis and preferably parallel to one another.

4. The device of claim 3, wherein one of said three lugs is situated on one side of said longitudinal axis and on a center plane of said cage, said center plane being perpendicular to said longitudinal axis, the other two said lugs being disposed on the other side o said longitudinal axis, one at said front end, the other at said rearward end of said cage.

5. The device of claim 3, wherein said lugs each have a rounded outer face at the upper and lower ends of said bore, all these faces being either concave or convex or alternately concave/convex.

6. The device of claim 5, wherein each said attachment and locking component co-operating with a corresponding said lug is made up of a threaded element fixed, at a top end thereof, to said vehicle, directly or by auxiliary means, and passing at a bottom end through the bore of said corresponding lug, and of locking elements respectively tightened against a top rounded face and a bottom rounded face of said lug.

7. The device of claim 6, wherein the diameter of said bore of each lug is chosen, relative to the diameter of said threaded element, in such a way that the center plane of said cage can be tilted by an angle β in all radial directions relative to a horizontal plane.

8. The device of claim 6, wherein said locking elements, on both sides of said lug, are made up each time of a nut, a spring washer, and at least one interposed element, the shape of the surface of said interposed element adjacent to the top or bottom face of said lug having a matching concave or convex shape.

9. The device of claim 8, wherein said cage, and said fixing and locking elements of said cage, are integral with said vehicle via at least one auxiliary element.

10. The device of claim 9, wherein said auxiliary element is a rigid plate.

11. The device of claim 1, wherein said cage, having an elongated shape with a longitudinal axis, comprises two suspension locations disposed at the two ends of said cage.

12. The device of claim 11, wherein said two suspension locations have a cylindrical shape, and in that said cage is locked after positioning by means of locking and fixing elements.

13. The device of claim 11, wherein said locking and fixing elements are made up of assemblies comprising brackets, screws, spring washers, and nuts.

14. The device of claim 11, wherein said suspension locations are both provided with rounded outer faces intended to be gripped by said locking elements.

15. The device of claim 11, wherein said cage, and said fixing and locking elements of said cage, are integral with said vehicle via at least one auxiliary element.

* * * * *